Sept. 4, 1951  H. R. BEACOM  2,566,305
SYSTEM FOR ELIMINATING OR GREATLY REDUCING THE
ERRORS IN GYROSCOPIC DEVICES OR THE LIKE
Filed Jan. 8, 1947  2 Sheets-Sheet 1
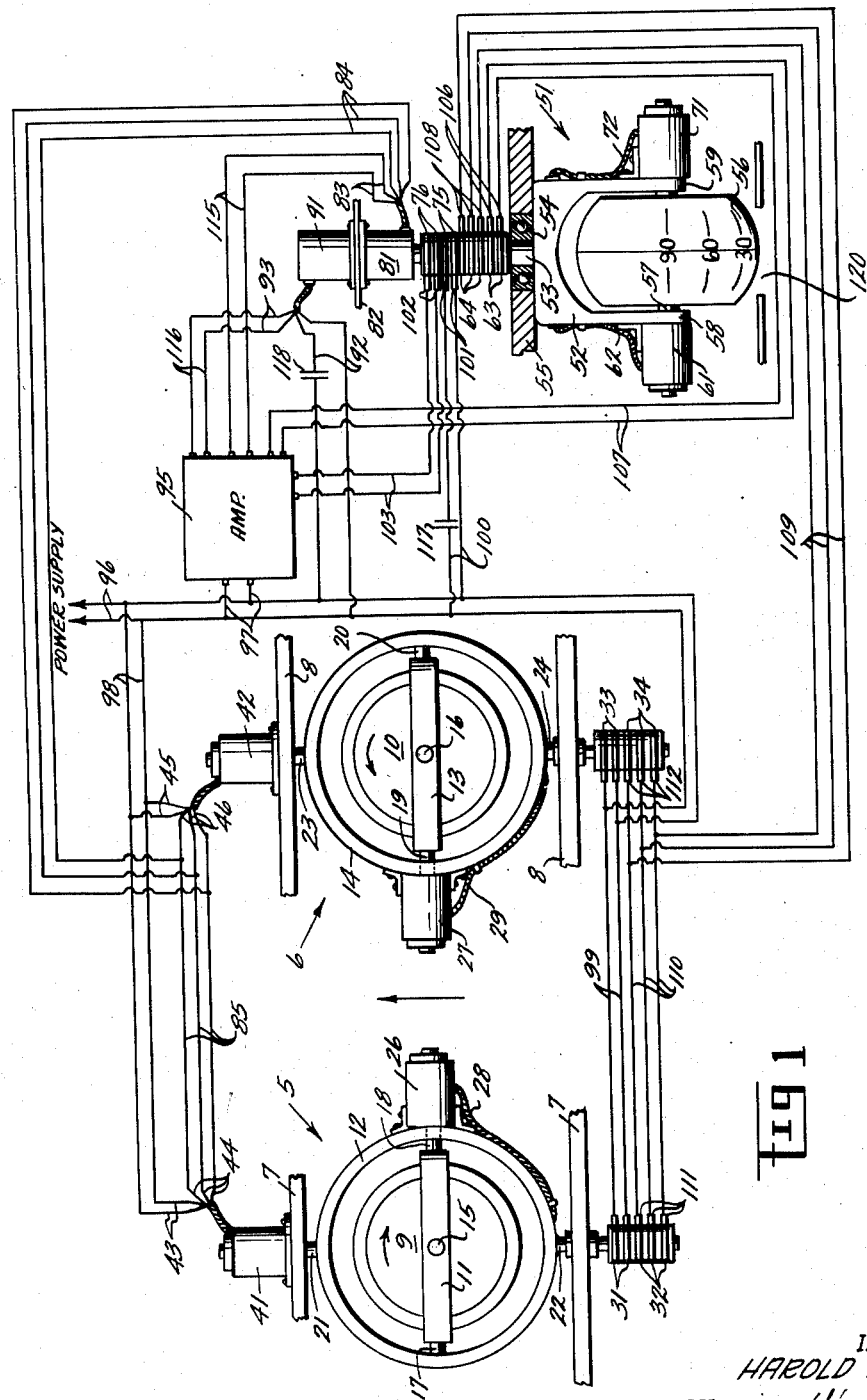
INVENTOR.
HAROLD R. BEACOM
BY Wade Koonty
ATTORNEY
H. H. Losche
AGENT

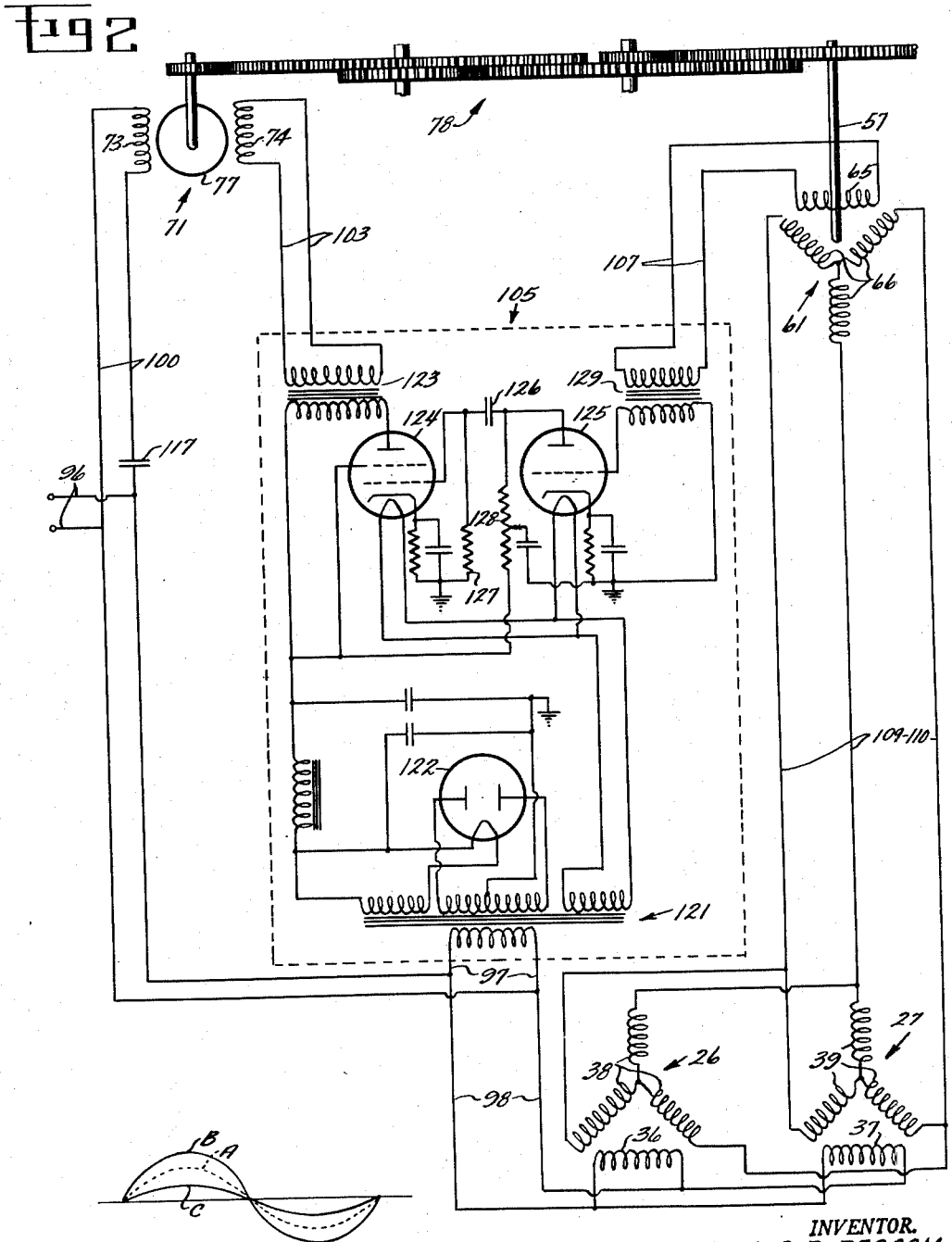

Patented Sept. 4, 1951

UNITED STATES PATENT OFFICE 2,566,305

SYSTEM FOR ELIMINATING OR GREATLY REDUCING THE ERRORS IN GYROSCOPIC DEVICES OR THE LIKE

Harold R. Beacom, Osborn, Ohio

Application January 8, 1947, Serial No. 720,893

9 Claims. (Cl. 33—204)

(Granted under the act of March 3, 1883, as amended April 30, 1928; 370 O. G. 757)

The invention described herein may be manufactured and used by or for the Government for governmental purposes without payment to me of any royalty thereon.

This invention relates to a device for eliminating or greatly reducing the errors or apparent errors in gyroscopes, or the like, by reducing a multiple of signals from a multiplicity of associated gyroscope actuated signal transmitting means to an average single signal.

The present invention emanated from a satisfactory solution to the problem of eliminating or substantially reducing the errors or apparent errors in gyroscopic devices. It is well understood that artificial and natural forces act on gyroscopes which introduce errors and apparent errors affecting their designed purpose, but by the use of two similarly independently mounted like gyroscopes operative to rotate in opposite directions the errors are substantially neutralized through proper pick-off means. The use of two similarly independently mounted like gyroscopes is explained in that centrifugal, acceleration, deceleration, or friction forces applied to the gyroscopes will be in the same direction for both gyroscope assemblies but since the directions of rotation of the gyroscopes are opposite the resulting precessions of the gyroscope axes of spin will be equal but in opposite directions. The mountings for the gyroscopes allows 360 degrees of free movement in any rotative direction. The apparent errors caused by the rotation of the earth or movement of the gyroscope around the earth are greatly reduced by making the gyroscopes slightly pendulous so that any movement around the earth's surface or the rotation of the earth will cause a pendulous torque to be applied to the gyroscopes in the same direction. Since the spin of the gyroscopes is in opposite directions the gyroscopic precessions will be equal but in approxmately opposte drectons and wll almost completely cancel out at a pont of reference.

Since the gyroscopes arranged in this manner operate to produce the errors in substantially equal and opposite directions along the spin axis a self-synchronous transmitter pick-off means is very effective to average the signals, originating at the gyroscopes, to be transmitted to a signal responsive receiver operative to control an operated element. The stators of the self-synchronous transmitters on the two gyroscopes and of the self-synchronous receiver are electrically connected in parallel whereby the signals induced in the stators of the transmitters are resolved into a single average signal by the receiver. In order to avoid any errors to be introduced in the gyroscopes, as a result of the feed-back in the stator circuits of the self synchronous transmitters causing a torque on the rotors, the rotor currents are kept very low in the transmitters and the averaged signal received by the receiver is amplified to perform its function. The self-synchronous transmitter-receiver system allows accurate operation throughout a full 360 degrees of movement and any mechanical friction thereof, although slight, will be canceled by the opposite precessions of the gyroscopes. Other known devices, as resistance or rheostat electric signal transmitter and receiver means, are not adaptable for efficient operation throughout 360 degrees of rotative movement and have considerable detrimental frictional resistance. The present invention provides a device having a high degree of accuracy necessary to precision instruments. The device is simple in construction and reliable in operation making its use attractive for precision work.

It is a primary object of this invention to provide a gyroscopically operated device in which at least two independently mounted oppositely rotatable gyroscopes each have a signal transmitting means to actuate an operated element or elements, the signal transmitting means being interrelated to average the angular difference between the gyroscopes.

It is another object of this invention to provide a method of eliminating or greatly reducing errors or apparent errors in gyroscopic devices, or the like, by averaging a multiple of signals obtained from a multiple of signal pick-off means of a multiple of gyroscopes for transmission to receiver elements responsive to an average signal.

It is a further object of this invention to provide a device for reducing a multiple of electric signals produced by a multiple of signal transmitting means to an average single signal.

It is still a further object of this invention to provide a gyroscopic attitude indicating device utilizing two independently universally mounted oppositely rotatable gyroscopes having the same spin axis orientation and corresponding axes of motion, a self-synchronous transmitter in operative relation with each of the axes of motion of each of the gyroscopes for producing a signal, the self-synchronous transmitters of corresponding axes of motion being connected in parallel for averaging the amplitude of the signal that is transmitted to the corresponding self-synchronous receiver on an indicator repeater where the signal is operative through the self-synchronous receiver to control a power amplifier which regulates a reversible motor for actuating the indicator repeater to maintain synchronism between corresponding self-synchronous transmitters and self-synchronous receivers for indication in accordance with the average position of the two gyroscopes relative to their mounts.

Other objects, advantages, and uses will become apparent upon consideration of the following detailed description taken in conjunction with the accompanying drawings, in which:

Fig. 1 is a diagrammatic illustration of the invention showing the external electrical circuit arrangement associated therewith;

Fig. 2 is a diagram of the electrical circuit illustrated in this invention with the mechanical drive connection shown schematically as related to the electric receiver and low inertia motor; and Fig. 3 is a graph of the amplitudes of the E. M. F. generated in one leg of a stator winding of cooperating self-synchronous transmitters and the average amplitude of the E. M. F. in this leg resulting therefrom.

Referring to Figs. 1 and 2, for describing the invention more in detail there are shown two gyroscope assemblies 5 and 6 mounted on frames 7 and 8, respectively, of an airplane or other vehicle in which the invention is used. Gyro rotors 9 and 10 are rotatably mounted for universal movement with respect to their supporting frame by inner and outer gimbal rings 11, 12 and 13, 14, respectively. The gyro rotors 9 and 10 are rotatable about a spin axis on bearings, preferably of the frictionless type, in the inner gimbal rings 11 and 13, respectively, as shown at 15 and 16, in the well known manner. The inner gimbal rings 11 and 13 are each rotatable on a diametrical axis, which is perpendicular to the respective gyro rotor spin axis, by shaft extension means 17, 18 and 19, 20, respectively, in bearings, preferably of the frictionless type, in the outer gimbal rings 12 and 14, respectively. The outer gimbal rings 12 and 14 are rotatably mounted in the frames 7 and 8 on diametrical axes by shaft extensions 21, 22 and 23, 24, respectively. From the above description it may be understood that the gyroscopes have freedom of movement throughout 360 degrees in any rotative direction.

The shaft extensions 18 and 19 of the two gyroscope assemblies are operatively connected to the rotors of self-synchronous transmitters 26 and 27 the stators of which are secured to the gimbal rings 12 and 14, respectively. The gimbal rings 12 and 14 may be enlarged or otherwise weighted diametrically opposite to the self-synchronous transmitters in order to obtain perfect balance of these gimbal rings on their shaft extensions 21, 22 and 23, 24, respectively. Electric cables 28 and 29 connect the self-synchronous transmitters 26 and 27, respectively, with slip rings 31, 32 and 33, 34 on the shaft extensions 22 and 24 of the gyroscopes, respectively, the slip rings 31 and 33 connect rotor windings, shown in diagram as 36 and 37 in Fig. 2, and the slip rings 32, 34 connect stator windings in the self-synchronous transmitters 26 and 27, shown as 38 and 39 in Fig. 2.

The shaft extensions 21 and 23 are mechanically connected to rotors of self-synchronous transmitters 41 and 42, respectively. Stators of the self-synchronous transmitters 41 and 42 are fastened to the frames 7 and 8 of the two gyroscope assemblies, respectively. Electrical conductors 43, 44 and 45, 46 enter the self-synchronous transmitters 41 and 42 respectively, the conductors 43 and 45 being connected to rotor windings and the conductors 44 and 46 being connected to stator windings.

The gyroscope assemblies are made slightly pendulous (not shown) in the well known manner for the purpose later to be described. The gyroscope assemblies could be on separate frames and at remote points, or the gyroscope assemblies may be assembled on the same frame, if the shaft extensions 21, 22 and 23, 24 are arranged in parallel relation.

Mounted at some desirable place in an aircraft, or other vehicle in which this device is used, is a repeater indicator assembly generally referred to by the reference character 51. The indicator comprises a bifurcated member 52 rotatably supported by a shaft 53 on a frictionless type of bearing 54 set in the framework 55 of the aircraft instrument case, or the like. An attitude spherical segment 56 is rotatably mounted by a shaft 57 in the arms 58 and 59 of the bifurcated member 52 by frictionless type bearings, or the like.

A self-synchronous receiver 61 has a rotor mechanically connected to the shaft 57 of the attitude spherical segment 56. A stator of the self-synchronous receiver 61 is secured to the arm 58 of the bifurcated member 52. An electric cable 62 is arranged to pass through the bifurcated member 52 and shaft 53 to connect a rotor winding of the self-synchronous receiver 61 to slip rings 63 and to connect stator windings to slip rings 64. The rotor winding of the self-synchronous receiver 61, as illustrated in Fig. 2, is shown as 65 while the stator windings are shown as 66.

A low inertia motor 71 has a stator body fastened to the arm 59 of the bifurcated member 52 and a rotor mechanically connected to the shaft 57 of the spherical segment 56. An electrical cable 71 passes through the bifurcated member 52 and 53 connecting a fixed phase stator winding and a variable phase stator winding, illustrated as 73 and 74, respectively, in Fig. 2, of the low inertia motor 71 to slip rings 75 and 76, respectively. The rotor of the low inertia motor 71, designated as 77 in Fig. 2, includes a reduction gear means 78 in its mechanical connection with the shaft 57 for providing smooth efficient actuation of the spherical segment 56. The bifurcated member 52 with its assembled parts is balanced about its rotatable axis along the shaft 53.

Another self-synchronous receiver 81, similar to the self-synchronous receiver 61, has a stator body member secured to a framework 82 that is relatively immovable with respect to the framework 55. A rotor in the self-synchronous receiver 81 is mechanically connected to the shaft 53 and includes a rotor winding electrically connectible through conductors 83. Stator windings in the self-synchronous receivers 81 are connected by leads 84 to electrical conductors 85 in circuit with stator windings 44 and 45 of the self-synchronous transmitters 41 and 42, the stator windings all being connected in parallel.

A low inertia motor 91, alike in all respects to the low inertia motor 71, has a stator body member connected to the framework 82 and a rotor mechanically connected through a reduction gearing means, like unto that shown at 78 in Fig. 2, to the shaft 53. The stator includes a fixed phase winding and a variable phase winding electrically connected to the leads 92 and 93, respectively.

Twin amplifiers, illustrated at 95, are adapted to be connected to a source of alternating current through the leads 96—97, and the rotors of the self-synchronous transmitters are adapted to be connected to the same source of alternating current supply through the conductors 98 and 99. The fixed phase winding 73 of the low inertia motor 71 is connected through the conductors 100 to brushes 101 connecting slip rings 75, and the variable phase winding 74 is connected through the slip rings 76, brushes 102, and conductors 103 to one of the amplifiers that may be referred to as the pitch amplifier, designated generally as 105 in Fig. 2. The rotor winding 65 of the self-synchronous receiver 61 is connected through the slip rings 63, brushes 106, and conductors 107 to the pitch amplifier 105. The stator windings 66 of the self-synchronous receiver 61 are connected through slip rings 64, brushes 108, conductors 109, 110, brushes 111, 112, and slip rings 32 and 34 to the stator windings 38 and 39 of the self-synchronous transmitters, the stator windings all being connected in electrical parallel relation. Conductors 115 and 116 connect the rotor winding of the self-synchronous receiver 81 and the variable phase winding of the low inertia motor 91, respectively, to the other amplifier, generally referred to as the roll amplifier. The fixed phase of the low inertia motor 91 is connected with the alternating current supply lines through the leads 92. Condensers 117 and 118 are placed in the fixed phase circuit of each low inertia motor to obtain a proper phase relation between the fixed and variable phase windings for proper operation of the low inertia motors.

As illustrated, the above described invention is particularly adaptable for a gyroscopic pitch and roll attitude indicator device with the gyroscope assemblies adapted to be taken through space in the direction indicated by the arrow therebetween. The self-synchronous transmitters 26, 27, self-synchronous receiver 61, low inertia motor 71, and pitch amplifier 105 are all in one complete circuit arrangement to give a pitch registration on the spherical segment 56 as seen through the window 120 on the instrument panel of the aircraft, or the like. The self-synchronous transmitters 41, 42, self-synchronous receiver 81, low inertia motor 91, and roll amplifier are all in another circuit to provide roll registration on the indicator 56.

As illustrated in Fig. 2 only one circuit arrangement for the indicating means is shown in the diagram since the self-synchronous electrical systems for both axes of motion are the same. The amplifier 105 has the primary winding of a transformer 121 connected with the alternating current supply through the leads 97. Current is taken from the secondary winding of the transformer 121 and passed through a full wave rectifying circuit including rectifying tube 122 and connected to the primary winding of a transformer 123 which is in series with a plate of an amplifier tube 124. The control grid of the amplifier tube 124 is coupled to the plate of an amplifier tube 125 by means of a condenser 126 and a resistor 127. Positive potential is supplied to the anode of the tube 125 through resistor 128 which is connected to the positive side of the power supply. The receiver rotor winding 65 is coupled to the grid of the amplifier tube 125 by transformer 129. The resulting amplified output of the amplifier tube 124 is applied to the variable phase winding 74 through the transformer 123. The fixed phase winding 73 of the low inertia motor 71 is connected in series with the condenser 117 across the alternating current supply 96. The valve of condenser 117 is such as to cause the current in the fixed phase winding 73 to be approximately 90 degrees out of phase with the current in the variable phase winding 74.

If the rotor winding 65 is in neutral position no voltage is induced therein and therefore there is no current in the variable phase winding 74; while if the rotor winding 65 is on one side of the neutral position the current in the variable phase winding 74 will lead the current in the fixed phase winding 73 by substantially 90 degrees causing the low inertia motor 71 to rotate in one direction; and if the rotor winding 65 is on the other side of the neutral position the current in the variable phase winding 74 will lag the current in the fixed phase winding 73 by substantially 90 degrees causing rotation of the low inertia motor 71 in the opposite direction.

In operation, the gyroscopes are made to rotate, in the well known manner, in opposite directions and are erected for the initial point of reference. An erection system is not shown inasmuch as the erection system may be of any type provided the system used on both gyroscope assemblies 5 and 6, has the same erection rate, the same general characteristics, erects the gyroscope from small displacements without causing the gyroscope axis to spiral, and is capable of being made totally inoperative during turns and/or periods of acceleration and deceleration or made inoperative for the axis affected. The spherical segment 56 will assume its position, as seen through the window 120, in proper relation to the earth by operation of the low inertia motors 71 and 91 through the self-synchronous and amplifier circuits. For the purpose of explanation let it be assumed that the device is being used in an aircraft which is flying such that the frames 7 and 8 are perfectly level and the self-synchronous transmitters and receivers of each electrical system are at rest as shown in Fig. 2. The indicator, comprising the spherical segment 56 as compared relative to indicia on the window opening 120 in the well known manner, will register zero pitch and zero roll. The spherical segment 56 of the indicator assembly 51 being stabilized by the gyroscopic system disclosed, the segment functions to establish a datum or positional reference means relative to the pitch and roll axes of the gyroscopic system and relative to the aircraft itself. Any maneuvering of the aircraft will cause registration by the indicator with respect to the pitch and roll of the aircraft. However, the maneuvering of the aircraft induces errors in the gyroscopes by reason of mechanical friction in the bearing parts and slip ring and brush parts, and by reason of the slightly pendulous arrangement of the gyroscopes producing a slight pendulous torque on the gyro rotors. The mechanical friction can not be completely overcome but similar construction of the two gyroscopes provides devices having equal mechanical resistance and consequently the pendulous torque will be similarly effective on both gyroscopes. Since the gyro rotors are rotating in opposite directions any forces by reason of mechanical friction or pendulous torques tending to shift the gyro rotor axis results in precessions of the gyro rotors to shift the gyro rotor spin axis of each gyroscope in a direction 90 degrees from the effective resultant applied forces to effect deviations in equal but opposite directions. This angular deviation rotates the rotors of the self-synchronous transmitters 26, 27 and 41, 42 in equal and opposite directions, respectively, which transmit electrical signals to the self-synchronous receivers 61 and 81, respectively. By way of example, when the aircraft makes a turn the roll of the aircraft will be registered on the indicator but a centrifugal force will be exerted on the slightly pendulous gyroscopes producing a pendulous torque tending to rotate them about their axes 21, 22 and 23, 24, respectively, and due to the gyroscopic action of the oppositely rotatable gyros the pendulous torque causes precession about the axes 17, 18 and 19, 20 of the respective gyroscopes in opposite directions. The precessional movement of each gyroscope produces a signal in the respective pitch transmitters 26 and 27 which signals are averaged in the electrical circuit arrangement to produce a correct reading on the indicator. Since the aircraft did not change in pitch the averaged signal is the same as the averaged signal before the turn was made. Thus, an error which would ordinarily be effected in a single gyroscope is eliminated by the use of the device prescribed herein.

Since the electrical system for both axes of motion are identical explanation will be confined to the operation of only one electrical system as shown in Fig. 2. The rotation of the rotors in the self-synchronous transmitters 26 and 27 in equal and opposite directions will rotate the rotor windings 36 and 37 in equal and opposite directions with respect to their corresponding stator windings 38 and 39. The magnetic field established by each rotor winding 36 and 37 corresponds to the position of the rotor and determines the amplitude and phase of the voltage generated in each leg of the stator windings 38 and 39 surrounding it, respectively. Since the stator windings 38 and 39 are connected in parallel to the stator winding 66 of the receiver, the voltage of the corresponding legs of the stator windings 38 and 39 of the transmitters are combined in the stator winding 66 of the receiver and the resulting currents set up a magnetic field in the receiver the position of which is the average position of the rotors of the transmitters. Thus, as shown in Fig. 3, curve A is the average voltage induced in one leg of the stator windings 38 and 39 when the rotor windings are displaced an equal amount and in opposite directions from the position at which the rotors are parallel; curve B shows the voltage induced in the corresponding leg of the transmitter stator winding 38 when the rotor winding 36 is displaced; and curve C shows the voltage induced in the corresponding leg of the transmitter stator winding 39 after its rotor winding 37 is displaced in the opposite direction. Then, since the two legs are connected in parallel the circulating currents between the corresponding legs of the two self-synchronous transmitter stator windings 38 and 39 cause the voltage across the parallel connected legs to be the average of the two induced voltages. In this manner only the average electrical voltage signal produced in the self-synchronous transmitters is effective in the self-synchronous receiver to induce a voltage in the self-synchronous receiver rotor winding 65. The position of the magnetic field set up in the stator winding 66 in this illustration, however, will remain unchanged and therefore no voltage will be induced in the rotor winding 65. Thus, the illustrated equal and opposite angular errors of the gyroscopes will be cancelled.

Now, if the aircraft changes its angle of pitch both rotor windings 36 and 37 will rotate in the same direction causing the magnetic fields to rotate in the stator windings 38 and 39 as well as in the stator winding 66 which will induce a voltage in the rotor winding 65. This induced voltage in the rotor winding 65 is operative through the amplifier 105, as hereinbefore described, to produce a current in the variable phase winding 74 to cause rotation of the low inertia motor 71 in a direction, dependent on the angular position of the rotor winding 65 from the neutral position, to rotate the shaft 57 through the reduction gearing 78 and to rotate the rotor, and consequently the rotor winding 65, to its neutral position. The shaft 57 being mechanically connected to the spherical segment 56 rotates it to the new position registering the new pitch angle of the aircraft. In actual operation, however, there is no lag in the indicator follow-up. That is, the response of the indicating means to the gimbal rings about the gyro rotors is practically instantaneous. The former errors in the two gyroscopes, or errors introduced therein as a result of the aforementioned change in pitch, are averaged in the electrical system to give the proper indication. The errors in the two gyroscopes can be quite large in this invention as long as they are equal and opposite. If the errors in one gyroscope become larger than the errors in the other gyroscope, as when the frictional resistances are different, the errors will be averaged in the usual manner and the actual resulting errors on the indicator will be exceedingly small with respect to the error of either gyroscope.

The spherical sector 56 may have the upper and lower halves in different colors as a light color upper background representing the skyward angles and a dark color lower background representing the earthward angles. By the use of this remote control system the low inertia motor 71 could be arranged in its operative connection with the spherical segment 56 to rotate this segment such that the pilot would be viewing the angles of pitch in the dark background when flying earthward and viewing the angles of pitch in the light background when flying skyward. Thus, the pilot would have a truer conception of the aircraft's attitudes with respect to the earth than other well known types of gyroscopic indicators in which it has been common practice for the indicator to read in the light background when the aircraft is flying earthward and vice versa. Attempts to place the dark background on the upper half of the spherical segment in the known indicators in order to get readings in the dark background upon earthward flying only confuses the pilot in level flight.

The use of this invention is in no wise restricted to pitch and roll attitude indicators. By rearranging the gyroscope assemblies a directional indication, or other desirable indications, may be obtained. Further, the number of gyroscope assemblies and the number of receivers may be increased where desirable since the self-synchronous electrical system is operative to average any number of signals for a single signal responsive element or a multiple of signal responsive elements. Likewise, the self-synchronous electrical system alone may find many uses of averaging mechanical movements of several elements as in calculating machines, several gas gages in a tank, several cameras, etc.

Although I have shown and described a specific embodiment of my invention, it will be apparent to those skilled in the art that various modifications and applications thereof, as well as changes in details of construction, may be made without departing from the spirit and scope of my invention and I desire to be understood that this invention is not limited to any specific form or arrangement of parts except as such limitations are specified in the claims.

I claim:

1. A gyroscopic device comprising, two similar independently and universally mounted gyroscopes including rotors driven in opposite directions of rotation on the respective spin axes thereof and each gyroscope having two axes of rotation perpendicular to each other with corresponding axes of said gyroscopes in approximate parallelism, self-synchronous transmitters operatively connected to said gyroscopes on each of said two axes of rotation and having stator windings on corresponding axes of rotation electrically connected in parallel relation with each other and with stator windings of separate self-synchronous receivers, rotor windings in said transmitters for connection to an alternating current source, an indicating instrument including means mounted for rotation on two axes perpendicular to each other to establish a datum relative to the two axes of rotation of said gyroscopes, shaft means on said two axes of said instrument included means each connected to one of said self-synchronous receivers and to an actuating motor, electrical coupling means between said self-synchronous receivers and said actuating motors, whereby the parallel connection of said stator windings on corresponding axes of rotation of said gyroscopes are operative to produce an average E. M. F. in the self-synchronous receivers for effecting operation of the corresponding actuating motors to produce instrument indication in accordance with the average angular deviation of the two gyroscopes about corresponding axes of rotation.

2. A gyroscopic device for eliminating or greatly reducing the errors induced therein comprising, two similar independently and universally mounted gyroscopes each having an outer gimbal ring, an inner gimbal ring and a central rotor mounted on bearings within the inner gimbal ring, means mounting the two outer gimbal rings for rotation about parallel axes, means mounting the two inner gimbal rings for rotation within the outer gimbal rings on parallel axes perpendicular to said parallel axes of rotation of said outer gimbal rings, means mounting a rotor within each inner gimbal ring for rotation about axes perpendicular to the axes of rotation of said inner gimbal rings, means to cause rotation of said two rotors in opposite directions at high speed, self-synchronous transmitters operatively connected to the respective gimbal rings at their axes of rotation, stator windings in said transmitters on corresponding axes of rotation connected in parallel relation with each other and with stator windings of self-synchronous receivers, rotor windings in said transmitters connected to an alternating current source, and means actuated jointly by said receivers for establishing a datum relative to the axes of rotation of said inner and outer gimbal rings in accordance with the average angular deviation of the two gyroscopes about corresponding axes of rotation of said gimbal rings.

3. A gyroscopic device for eliminating or greatly reducing the errors induced therein comprising, two similar independently and universally mounted gyroscopes each having an outer gimbal ring, an inner gimbal ring and a central rotor mounted on bearings within the inner gimbal ring, means mounting the two outer gimbal rings for rotation about parallel axes, means mounting the two inner gimbal rings for rotation within the outer gimbal rings on parallel axes perpendicular to said parallel axes of rotation of said outer gimbal rings, means mounting a rotor within each inner gimbal ring for rotation about axes perpendicular to the axes of rotation of said inner gimbal rings, means to cause rotation of said two rotors in opposite directions at high speed, self-synchronous transmitters operatively connected to the respective gimbal rings at their axes of rotation, stator windings in said transmitters on corresponding axes of rotation connected in parallel relation with each other and with stator windings of self-synchronous receivers, rotor windings in said transmitters connected to an alternating current source, an indicating instrument including means mounted for rotation on two axes perpendicular to each other to establish a datum relative to the two axes of rotation of said gyroscopes, shaft means on said two axes of said instrument included means each connected to one of said self-synchronous receivers and to an actuating motor, electrical coupling means between said self-synchronous receivers and said actuating motors, whereby the parallel connection of said stator windings on corresponding axes of rotation of said gyroscopes are operative to produce an average E. M. F. in the self-synchronous receivers for effecting operation of the corresponding actuating motors to produce instrument indication in accordance with the average angular deviation of the two gyroscopes about corresponding axes of gimbal ring rotation.

4. A gyroscopic device comprising, two similar independently and universally mounted gyroscopes each having an outer gimbal ring, an inner gimbal ring and a central rotor mounted on bearings within the inner gimbal ring, means mounting the two outer gimbal rings for rotation about parallel axes, means mounting the two inner gimbal rings for rotation within the outer gimbal rings on parallel axes perpendicular to said parallel axes of rotation of said outer gimbal rings, means mounting a rotor within each inner gimbal ring for rotation about axes perpendicular to the axes of rotation of said inner gimbal rings, means to cause rotation of said two rotors in opposite directions at high speed, similar signal producing means operatively connected to the inner and outer gimbal rings of each gyroscope on their respective axes of rotation, interconnecting means between the similar signal producing means on corresponding axes of said gyroscopes to provide separate average signal outputs proportional to the average angular displacements of the inner and outer gimbal rings about their axes of rotation, and means actuated jointly by said signal outputs for establishing a datum relative to the axes of rotation of said inner and outer gimbal rings in accordance with the average angular deviation of the two gyroscopes about corresponding axes of rotation of said gimbal rings.

5. A gyroscopic device comprising, two similar independently and universally mounted gyroscopes including rotors driven in opposite directions of rotation on the respective spin axes thereof and each gyroscope having two axes of rotation perpendicular to each other with corresponding axes of said gyroscopes in approximate parallelism, self-synchronous transmitters operatively connected to said gyroscopes on each of said two axes of rotation and including field windings, interconecting means between the field windings of transmitters on corresponding axes of rotation of said gyroscopes to provide separate average signal outputs proportional to the average angular displacements of the gyroscopes about corresponding axes of rotation, two separate self-synchronous receivers including field windings respectively energized by said separate average signal outputs, an instrument including means mounted for rotation about two axes perpendicular to each other to establish a datum relative to the two axes of rotation of said gyroscopes, shaft means on said two axes of said instrument included means each connected to one of said self-synchronous receivers and to an actuating motor, electrical coupling means between said self-synchronous receivers and said actuating motors, whereby said separate average signal outputs are operative to produce an average E. M. F. in each self-synchronous receiver for effecting operation of the corresponding actuating motors to produce instrument action through said shaft means on said two axes in accordance with the average angular deviation of the two gyroscopes about corresponding axes of rotation.

6. A gyroscopic device comprising, two similar independently mounted gyroscope assemblies including separate rotors driven in opposite directions of rotation on the respective spin axes thereof and each gyroscope assembly having means providing two axes of rotation with corresponding axes of said gyroscope assemblies in approximate parallelism, self-synchronous transmitters operatively connected to said gyroscope assemblies on each of said two axes of rotation of each gyroscope assembly, stator windings of the transmitter on one axis of one gyroscope assembly being electrically connected in parallel relation with the stator windings of the transmitter on the corresponding axis of the other gyroscope assembly and with the stator windings of a first self-synchronous receiver, stator windings of the other two transmitters on corresponding axes of said gyroscope assemblies being electrically connected in parallel relation with each other and with the rotor windings of a second self-synchronous receiver, rotor windings in each of said transmitters for connection to an alternating current source, and means actuated jointly by said first and second self-synchronous receivers for establishing a datum relative to said two axes of rotation of said gyroscope assemblies in accordance with the average angular deviation of the two gyroscope assemblies about corresponding axes of rotation.

7. A gyroscopic device comprising, two similar independently mounted gyroscope assemblies including separate rotors driven in opposite directions of rotation on the respective spin axes thereof and each gyroscope assembly having means providing two axes of rotation with corresponding axes of said gyroscope assemblies in approximate parallelism, similar signal producing means operatively connected to said gyroscope assemblies on each of said two axes of rotation of each gyroscope assembly, interconnecting means between the similar signal producing means on corresponding axes of said gyroscope assemblies to provide two separate average signal outputs proportional to the average angular displacements of the gyroscope assemblies about corresponding axes of rotation, and means actuated jointly by said signal outputs for establishing a datum relative to said two axes of rotation of said gyroscope assemblies in accordance with the average angular deviation of the two gyroscope assemblies about corresponding axes of rotation.

8. A gyroscopic device comprising, two similar independently mounted gyroscope assemblies including separate rotors driven in opposite directions of rotation on the respective spin axes thereof and each gyroscope assembly having means providing two axes of rotation with corresponding axes of said gyroscope assemblies in approximate parallelism, two self-synchronous transmitters, means operatively connecting separate transmitters to the respective gyroscope assemblies on corresponding axes of rotation, a self-synchronous receiver, stator windings of said two transmitters being electrically connected in parallel relation with each other and with the stator windings of said self-synchronous receiver, rotor windings in each of said transmitters for connection to an alternating current source, and means actuated by said self-synchronous receiver for establishing a datum relative to the corresponding axes of rotation of said gyroscope assemblies connected to said separate transmitters in accordance with the average angular deviation of the two gyroscope assemblies about said corresponding axes of rotation connected to said transmitters.

9. A gyroscopic device comprising, two similar independently mounted gyroscope assemblies including separate rotors driven in opposite directions of rotation on the respective spin axes thereof and each gyroscope assembly having means providing two axes of rotation with corresponding axes of said gyroscope assemblies in approximate parallelism, two signal producing devices, means operatively connecting separate signal producing devices to the respective gyroscope assemblies on corresponding axes of rotation, interconnecting means between said two signal producing devices to provide a single average signal output proportional to the average angular displacement of the gyroscope assemblies about the corresponding axes of rotation connected to said signal producing devices, and means actuated by said average signal output for establishing a datum relative to the corresponding axes of rotation of said gyroscope assemblies connected to said two signal producing devices in accordance with the average angular deviation of the two gyroscope assemblies about said corresponding axes of rotation connected to said two signal producing devices.

HAROLD R. BEACOM.

REFERENCES CITED

The following references are of record in the file of this patent:

UNITED STATES PATENTS

| Number | Name | Date |
|---|---|---|
| 1,050,153 | Marmonier | Jan. 14, 1913 |
| 1,429,588 | Hayford et al. | Sept. 19, 1922 |
| 1,465,532 | Sundhausen | Aug. 21, 1923 |
| 1,655,244 | Rowell | Jan. 3, 1928 |
| 1,732,987 | Rowell | Oct. 22, 1929 |
| 2,197,890 | Koster | Apr. 23, 1940 |
| 2,292,451 | Koster | Aug. 11, 1942 |
| 2,320,354 | Fedde | June 1, 1943 |
| 2,459,830 | McCarthy | Jan. 25, 1949 |
| 2,460,798 | McCarthy | Feb. 8, 1949 |
| 2,469,403 | Parker | May 10, 1949 |

FOREIGN PATENTS

| Number | Country | Date |
|---|---|---|
| 589,216 | France | Feb. 18, 1925 |